United States Patent

[11] 3,628,682

[72] Inventor Gerald L. Paulson
Anaheim, Calif.
[21] Appl. No. 50,464
[22] Filed June 29, 1970
[45] Patented Dec. 21, 1971
[73] Assignee Beckman Instruments, Inc.

[54] LIGHTTIGHT SAMPLE INTRODUCTION SYSTEM
16 Claims, 5 Drawing Figs.
[52] U.S. Cl. .................................................. 220/20.5,
73/422, 222/541, 356/246
[51] Int. Cl. ........................................................ G01n 1/10
[50] Field of Search ............................................ 220/20.5;
73/422; 222/541; 356/246

[56] References Cited
UNITED STATES PATENTS
2,813,649  11/1957  Lipari .......................... 220/20.5 X
3,438,263  4/1969   Webb ........................... 73/422

Primary Examiner—M. Henson Wood, Jr.
Assistant Examiner—Michael Y. Mar
Attorneys—Thomas L. Peterson and Robert J. Steinmeyer ABSTRACT: Apparatus for introducing a sample into a housing while preventing the introduction of light thereinto, the housing having an access opening therein, wherein a cylinder is mounted in the opening in the housing, the cylinder partially extending into the housing and being open at both ends thereof. A shutter is mounted for movement between a first position blocking the opening at the inner end of the cylinder and a second position providing access to the housing. A piston is mounted for movement through the cylinder, the piston lightsealing the opening through the cylinder. The piston has a passageway therethrough which is adapted to receive, in lighttight relationship, a sample introduction device, such as a pipette. The piston further includes means for engaging and actuating the shutter, such actuating means moving the shutter from the first position to the second position as the piston is depressed into the cylinder.

INVENTOR.
GERALD L. PAULSON
BY
Thomas L. Peterson
ATTORNEY

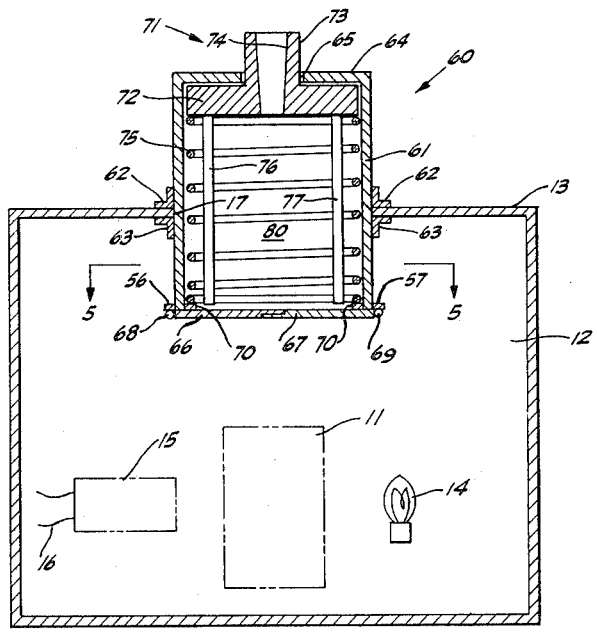
Fig 3
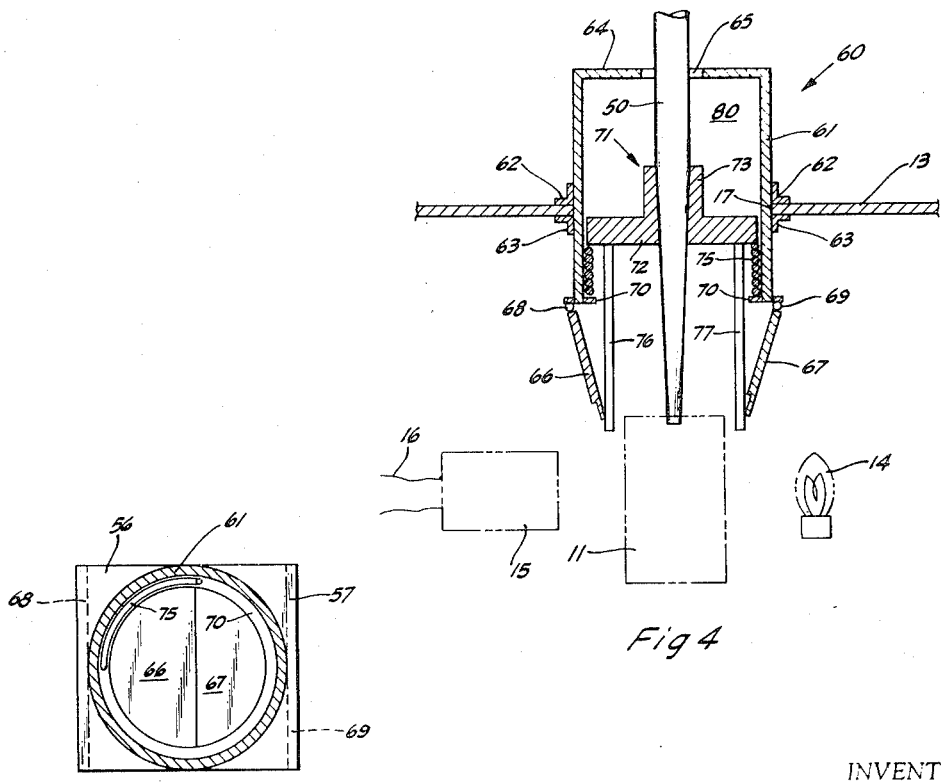
Fig 4
Fig 5
INVENTOR.
GERALD L. PAULSON
BY Thomas L. Peterson
ATTORNEY 3,628,682

LIGHTTIGHT SAMPLE INTRODUCTION SYSTEM

BACKGROUND OF THE INVENTION

1. Field of the Invention

The present invention relates to a lighttight sample introduction system and, more particularly, to apparatus for introducing sample into a liquid cell while preventing the introduction of light thereinto.

2. Description of the Prior Art

Many chemical reactions are monitored and analyzed by detecting the effect of the chemical reaction upon a light beam. For example, in a spectrophotometric or fluorometric procedure, a liquid sample cell is mounted within a lighttight housing with a light source on one side of the cell and a light detector on the other side of the cell. When a sample is introduced or added to the liquid cell, the chemical reaction in the cell modulates the light passing therethrough, such modulation being detected by the detector which provides an electrical output signal which is indicative of the chemical reaction.

When introducing or adding sample to such a liquid cell, it has been common practice to either disable the detector or block the light beam to prevent large modulations in the detector output due to light leakage into the housing. These procedures, however, significantly delay the making of measurements after sample introduction since the detector typically has a long recovery time due to hysteresis effects. In addition, since the detector has been disabled or blocked during sample introduction, it has not been possible to monitor, instrumentally, the chemical reaction during sample addition.

SUMMARY OF THE INVENTION

According to the present invention, there is provided a lighttight sample introduction system which allows samples to be introduced into the sample cell without upsetting the operation of the detector. Therefore, the present system permits uninterrupted measurement of the chemical reaction within the cell before, during and after sample addition. In addition, since the detector is no longer disabled or blocked, the present system also eliminates the delay of measurement during recovery of the detector.

Briefly, the present lighttight sample introduction system for introducing a sample into a housing while preventing the introduction of light thereinto includes a cylinder mounted in an opening in the housing, the cylinder partially extending into the housing and being open at both ends thereof. A shutter is mounted for movement between a first position blocking the opening at the inner end of the cylinder and a second position providing access to the housing. A piston is mounted for movement through the cylinder, the piston lightsealing the opening through the cylinder. The piston has a passageway therethrough which is adapted to receive, in lighttight relationship, a sample introduction device such as a pipette. The piston further includes means for engaging and actuating the shutter, such actuating means moving the shutter from the first position to the second position as the piston is depressed into the cylinder, the pipette extending through the passageway in the piston and through the inner opening in the cylinder into the housing when the piston is depressed.

It is therefore an object of the present invention to provide a lighttight sample introduction system.

It is a further object of the present invention to provide apparatus for introducing a sample into a housing while preventing the introduction of light thereinto.

It is a still further object of the present invention to provide apparatus for introducing or adding sample to a liquid cell during a spectrophotometric or fluorometric procedure which eliminates the need for disabling or blocking the detector.

It is another object of the present invention to provide apparatus for introducing or adding sample to a liquid cell during a spectrophotometric or fluorometric procedure which allows samples to be added without upsetting the detector providing the ability to monitor the sample during introduction as well as eliminating the recovery time which results from beam blockage or disablement of the detector.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 3 is a longitudinal sectional view of a second embodiment of lighttight sample introduction system constructed in accordance with the teachings of the present invention prior to the introduction or addition of sample;

FIG. 4 is a longitudinal sectional view of a portion of the apparatus of FIG. 3 showing the manner of introducing sample to a liquid cell; and FIG. 5 is a sectional view taken along the line 5—5 in FIG. 3.

DESCRIPTION OF THE PREFERRED EMBODIMENTS

Figure 1:
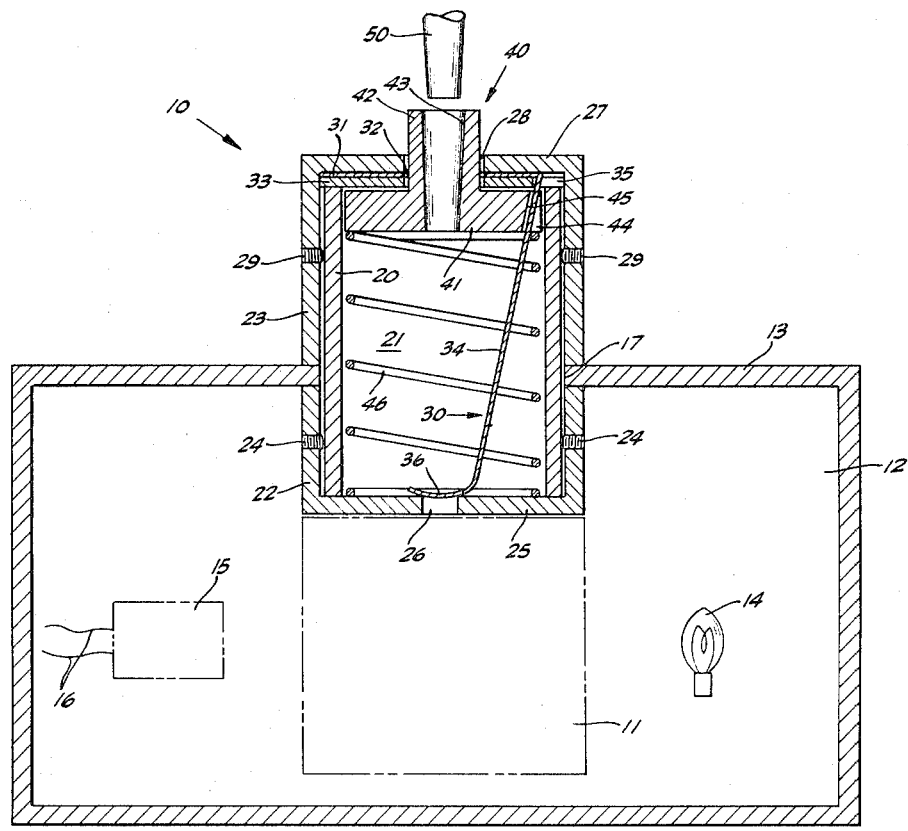
FIG. 1 is a longitudinal sectional view of a first embodiment of lighttight sample introduction system constructed in accordance with the teachings of the present invention prior to the introduction or addition of sample.

Referring now to the drawings and, more particularly, to FIG. 1 thereof, the first embodiment of a lighttight sample introduction system, generally designated 10, is adapted for use in introducing or adding sample to a liquid sample cell 11 of the type used, for example, in a spectrophotometric or fluorometric procedure. Such cells are used in the monitoring of the effect of chemical reactions upon a light beam. More specifically, sample cell 11 may be mounted within a lighttight housing 12 having an outer wall 13. A light source 14 may be mounted in any convenient manner on one side of cell 11 to direct a beam of light therethrough. A photodetector 15 is then mounted on the opposite side of cell 11 so as to detect the light beam from source 14 passing through cell 11. In this manner, when a sample is introduced or added to cell 11, the chemical reaction therein modulates the light beam passing therethrough, such modulation being sensed by detector 15 which provides an electrical output signal on leads 16, such output signal being indicative of the chemical reaction.

System 10 permits the introduction or addition of a sample into cell 11 from a point outside of housing 12 while preventing the introduction of light from outside of housing 12 thereinto. For this prupose, wall 13 of housing 12 includes an opening 17 positioned directly above cell 11. For the purposes of example, opening 17, as well as most of the remaining components of system 10, will be described as being circular in cross section. However, it will be understood by those skilled in the art that opening 17 and the remaining components of system 10 may be rectangular in cross section or have any other convenient shape.

System 10 includes a cylinder 20 which extends through opening 17 in wall 13 of housing 12, a portion of cylinder 20 extending on one side of wall 13 and another portion extending on the other side of wall 13. Cylinder 20 forms a chamber 21 which is open at both ends thereof. Cylinder 20 may be secured in opening 17 of wall 13 in any convenient manner. According to the first embodiment of the present invention, cylinder 20 is secured in opening 17 of wall 13 by means of first and second generally cylindrical, cup-shaped end caps 22 and 23. Cap 22 surrounds the portion of cylinder 20 which extends into housing 12 and is attached to cylinder 20 by means of a plurality of setscrews 24 which are spaced around the circumference of end cap 22. One end of end cap 22 is partially closed by a disc-shaped portion 25 having an opening 26 in the center thereof which provides access to cell 11 in housing 12. The other end of end cap 22 is entirely open and bears against the inner side of wall 13 adjacent and surrounding opening 17 therein. In this manner, end cap 22 prevents upward movement of cylinder 20 through opening 17.

End cap 23 is substantially identical to end cap 22 and surrounds the portion of cylinder 20 which extends out of housing 12. End cap 23 is attached to cylinder 20 by means of a plurality of set screws 29 which are spaced around the circumference of end cap 23. One end of end cap 23 is partially closed by a disc-shaped portion 27 having an opening 28 in the center thereof, opening 28 registering with opening 26. The other end of end cap 23 is entirely open and bears against the outer side of wall 13 adjacent and surrounding opening 17 therein. In this manner, end cap 23 prevents downward movement of cylinder 20 through opening 17 in wall 13, the combination of end caps 22 and 23 fixidly securing cylinder 20 in opening 17.

A shutter, generally designated 30, is positioned within chamber 21 to selectively block passageway 26 to prevent light from entering housing 12. Shutter 30 includes an upper annular portion 31 having a cylindrical opening 32 in the center thereof. Annular portion 31 of shutter 30 is positioned in chamber 21 in contact with the inner surface of portion 27 of end cap 23. When so positioned, opening 32 in annular portion 31 registers with opening 28 in portion 27 of end cap 23. Annular portion 31 of shutter 30 is held in contact with portion 27 of end cap 23 by means of a washer 33. One side of washer 33 bears against annular portion 31 of shutter 30 whereas the opposite side of washer 33 contacts the upper end of cylinder 20 which thereby holds washer 33 and annular portion 31 against end cap 23.

Shutter 30 also includes a thin, generally rectangular, elongated portion 34, one end of which is secured to the periphery of annular portion 31. Rectangular portion 34 of shutter 30 extends downwardly into chamber 21 through a slot 35 in washer 33. Connected to the other end of rectangular portion 34 of shutter 30 is a cup-shaped portion 36 which may, for example, be a segment of a sphere. As shown in FIG. 1, the length of rectangular portion 34 of shutter 30 and the angular relationship between portions 34 and 31 are such that cup-shaped portion 36 of shutter 30 normally rests in contact with the inner periphery of opening 26 in portion 25 of end cap 22. Therefore, with shutter 30 in the position shown in FIG. 1, opening 26 is effectively blocked, preventing both the introduction of sample and light into housing 12 and cell 11.

System 10 also includes a movable piston, generally designated 40. Piston 40 includes a disc-shaped portion 41 which is positioned within chamber 21 in contact with the inner wall of cylinder 20. Piston 40 is made from a nontransparent material such as black Teflon whereby portion 41 effectively light-seals the upper end of chamber 21. Piston 40 also includes a cylindrical shaft 42 which is secured to one side of portion 41, shaft 42 extending through washer 33 and openings 32 and 28 in annular portion 31 of shutter 30 and portion 27 of end cap 23, respectively. Piston 40 has a tapered passageway 43 extending entirely therethrough, through the centers of disc-shaped portion 41 and shaft 42, passageway 43 registering with opening 26 in end cap 22. Rectangular portion 34 of shutter 30 extends through a slot 44 in portion 41 of piston 40. Slot 44 has an inner wall 45 which may have any desired shape, as will appear hereinafter. In the present case, wall 45 is shown as being positioned at substantially the same angle relative to cylinder 20 as rectangular portion 34 of shutter 30. Finally, system 10 includes a coiled spring 46 which extends from disc-shaped portion 25 of end cap 22 to portion 41 of piston 40. In this manner, piston 40 is held and biased in the position shown in FIG. 1.

Figure 2:
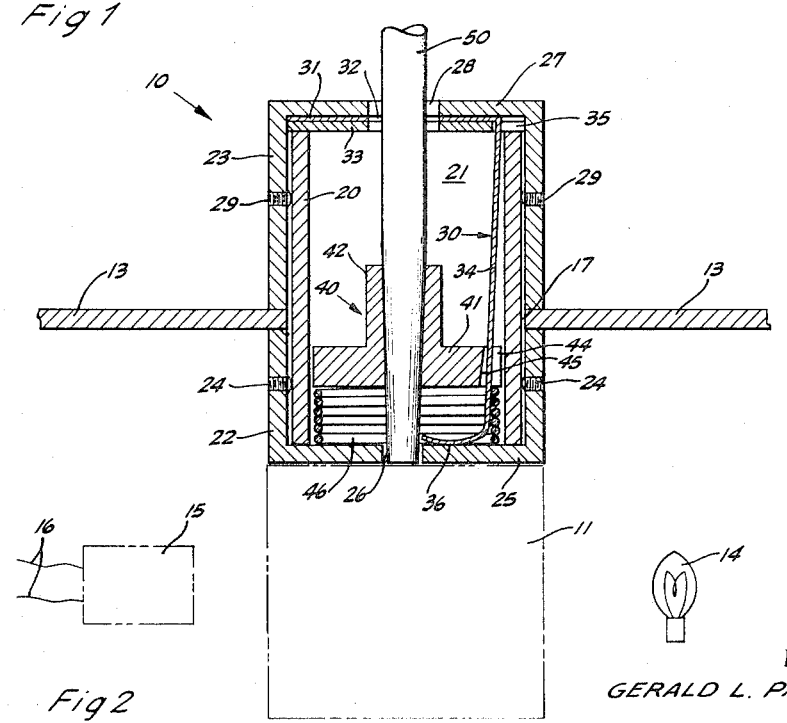
FIG. 2 is a longitudinal sectional view of a portion of the apparatus of FIG. 1 showing the manner of introducing sample to a liquid cell.

In operation, and with reference to FIGS. 1 and 2, when it is desired to introduce or add sample to cell 11, the tip of a pipette 50 is inserted into tapered passageway 43 in piston 40. Pipette 50 would have the same taper as passageway 43 to provide a lighttight contact therebetween to block out ambient light. As pressure is applied to piston 40, by pushing down on pipette 50, piston 40 moves downwardly thereby compressing spring 46. As piston 40 moves downwardly, inner wall 45 of slot 44 in piston 40 bears against rectangular portion 34 of shutter 30 thereby forcing rectangular portion 34 toward cylinder 20. As rectangular portion 34 is moved toward cylinder 20, cup-shaped portion 36 of shutter 30 is moved away from passageway 26 in end cap 22. Therefore, when piston 40 reaches the end of its stroke through chamber 21, as shown in FIG. 2, cup-shaped portion 36 of shutter 30 has been moved entirely away from opening 26 providing access for the tip of pipette 50 to cell 11.

After the sample has been added to cell 11, the operator releases the downward pressure on pipette 50 whereby spring 46 returns piston 40 to its full upward position, as shown in FIG. 1. As piston 40 moves upwardly, rectangular portion 34 of shutter 30 is allowed, under the control of wall 45 of slot 44 to move inwardly until cup-shaped portion 36 of shutter 30 recovers opening 26 in end cap 22. Therefore, by the time pipette 50 is removed from piston 40 providing light access through passageway 43 into chamber 21, shutter 30 has completely blocked passageway 26 thereby preventing the introduction of such light into housing 12 and cell 11.

Referring now to FIGS. 3-5, the second embodiment of a lighttight sample introduction system, generally designated 60, includes a cylinder 61 which extends through opening 17 in wall 13 of housing 12. For the purposes of example, opening 17 and cylinder 61 will again be described as being circular in cross section. However, it will be understood that the components of system 60 may be rectangular in cross section or have any other convenient shape.

Cylinder 61 is secured to wall 13 by means of a plurality of upper and lower L-shaped, annular flanges 62 and 63, respectively. Cylinder 61 forms a chamber 80 which is open at both ends thereof. The outer end of cylinder 61 is partially sealed by a disc-shaped portion 64 having a central opening 65 therein. The other end of cylinder 61 is open and has attached to opposite sides thereof a pair of rectangular, overlapping shutters 66 and 67. Shutters 66 and 67 are connected by hinges 68 and 69, respectively, to support brackets 56 and 57 secured to the side of cylinder 61 adjacent the end thereof. Hinges 68 and 69 are of the spring-biased type which normally hold shutters 66 and 67 in a substantially parallel, horizontal, overlapping position. A ringlike member 70 is secured to the bottom of the inner wall of cylinder 61 to prevent upward movement of shutters 66 and 67 beyond the horizontal position. Member 70 also serves another purpose, to be described hereinafter.

System 60 includes a piston 71 which is similar to piston 40 of system 10 and includes a disc-shaped portion 72, a shaft 73 and a tapered passageway 74. Passageway 74 is adapted to receive a tapered pipette 50 as in system 10. Piston 71 is held in its uppermost position by means of a coiled spring 75 which extends from member 70 to the bottom of portion 72 of piston 71. Finally, piston 71 includes a pair of actuating arms 76 and 77 which extend downwardly from portion 72 thereof into chamber 80.

In operation, when sample is to be added to cell 11, the tip of pipette 50 is placed into tapered passageway 74 in piston 71 thereby blocking out ambient light from chamber 80. As pressure is applied to piston 71, by pushing down on pipette 50, piston 71 moves downwardly compressing spring 75. As piston 71 continues to move downwardly, arms 76 and 77 contact shutters 66 and 67, respectively, causing shutters 66 and 67 to pivot around hinges 68 and 69, respectively, as shown in FIG. 4. Therefore, when piston 71 reaches the bottom of its stroke through chamber 80, shutters 66 and 67 are open providing access for the tip of pipette 50 to sample cell 11. It should also be noted that the spacing between arms 76 and 77 is greater than the width of cell 11 so that arms 76 and 77 pass on either side of cell 11 thereby permitting pipette 50 to extend into cell 11. The length of the stroke of piston 71 in system 60 would also be longer than the stroke of piston 40 in system 10.

After the sample has been added, the operator releases the downward pressure on pipette 50 whereby spring 75 returns piston 71 to its full upward position, as shown in FIG. 3. As piston 71 moves upwardly, arms 76 and 77 release shutters 66 and 67, respectively, allowing shutters 66 and 67 to return to the closed position. Therefore, by the time pipette 50 is removed from piston 71 providing light access through passageway 74 into chamber 80, shutters 66 and 67 have completely closed the bottom of cylinder 61 thereby preventing the introduction of such light into housing 12 and cell 11.

It can therefore be seen that in accordance with the present invention, there is provided lighttight sample introduction systems which allow samples to be introduced into a sample cell 11 positioned within a housing 12 without upsetting the operation of a light-sensitive detector 15. The present systems completely eliminate the necessity for disabling or blocking detector 15 thereby eliminating the long recovery times in detector 15 due to hysteresis effects. In addition, with the present system, uninterrupted measurement of the chemical reaction within cell 11 is permitted before, during and after sample addition.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. Apparatus for introducing a sample into a housing while preventing the introduction of light thereinto, said housing having an opening therein, comprising:
    means forming a chamber extending through said opening in said housing, said chamber having first and second openings at the opposite ends thereof, said first opening being inside of said housing and said second opening being outside of said housing;
    shutter means being movable between a first position blocking said first opening and a second position providing access through said first opening into said housing; and
    piston means mounted for movement through said chamber for lightsealing said chamber, said piston means including:
    a passageway therethrough adapted to receive, in lighttight relationship, a sample introduction device, said passageway registering with said first opening in said chamber; and
    actuating means for engaging and actuating said shutter means, said actuating means moving said shutter means from said first position to said second position as said piston means is depressed into said chamber.

2. Apparatus according to claim 1 further comprising:
    means for biasing said shutter means in said first position.

3. Apparatus according to claim 2 further comprising:
    means for biasing said piston means in a position adjacent said second opening in said chamber.

4. Apparatus according to claim 3 wherein said passageway through said piston is tapered and wherein said sample introduction device comprises an elongated member adapted to extend through said passageway, said member being tapered at the same angle as said passageway whereby said member engages and lightseals said passageway.

5. Apparatus according to claim 4 wherein depression of said tapered elongated member depresses said piston means into said chamber, said member extending through said first opening in said chamber into said housing when said piston means is depressed.

6. Apparatus according to claim 5 wherein said piston biasing means raises said piston means when said elongated member is released and wherein said shutter-biasing means simultaneously returns said shutter means to said first position.

7. Apparatus according to claim 1 wherein said shutter means comprises:
    a fixed member secured adjacent said second opening in said chamber;
    an elongated member connected at one end thereof to said fixed member, said elongated member extending through said chamber; and
    a movable member connected to the other end of said elongated member, said movable member being held adjacent and blocking said first opening in said chamber.

8. Apparatus according to claim 7 wherein the dimensions of said first opening are small compared to the cross section of said chamber; wherein said first opening is positioned in the center of the cross section of said chamber; wherein said one end of said elongated member is connected adjacent the periphery of said chamber; wherein said movable member is positioned in the center of said chamber blocking said first opening; and wherein said elongated member extends from the periphery of said chamber towards the center of said chamber.

9. Apparatus according to claim 8 wherein said piston means has a slot therein adjacent the periphery thereof, said elongated member extending through said slot in said piston means, said elongated member bearing against the inner wall of said slot, said inner wall shifting the position of said other end of said elongated member toward said periphery thereby moving said movable member from said first position to said second position as said piston means is depressed.

10. Apparatus according to claim 9 wherein said elongated member resiliently holds said movable member adjacent said first opening, and further comprising:
    means for biasing said piston means in a position adjacent said second opening.

11. Apparatus according to claim 10 wherein said biasing means raises said piston means when said piston means is released and wherein said elongated member simultaneously returns said movable member to said first position.

12. Apparatus according to claim 1 wherein said shutter means comprises:
    first and second members being pivotably mounted on opposite sides of said means forming a chamber, said members overlapping to block said first opening in said chamber.

13. Apparatus according to claim 12 further comprising:
    means for biasing said members in a substantially parallel, overlapping, horizontal position.

14. Apparatus according to claim 13 wherein said actuating means comprises:
    first and second arms extending from said piston means into said chamber, said first and second arms being operative to engage said first and second members, respectively, when said piston means is depressed into said chamber, said arms causing said members to pivot away from said first opening providing access through said chamber into said housing.

15. Apparatus according to claim 14 further comprising:
    means for biasing said piston means in a position adjacent said second opening in said chamber.

16. Apparatus according to claim 14 wherein said piston biasing means raises said piston means when said piston means is released and wherein said means for biasing said members simultaneously returns said members to said overlapping position.

* * * * *